United States Patent
Ziehr et al.

(10) Patent No.: US 8,387,406 B2
(45) Date of Patent: Mar. 5, 2013

(54) REFRIGERANT SYSTEM OIL ACCUMULATION REMOVAL

(75) Inventors: Lawrence P. Ziehr, Clarkston, MI (US); Gregory A. Major, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1209 days.

(21) Appl. No.: 12/209,797

(22) Filed: Sep. 12, 2008

(65) Prior Publication Data

US 2010/0064700 A1 Mar. 18, 2010

(51) Int. Cl.
*F25B 47/00* (2006.01)
(52) U.S. Cl. ........................................... 62/278
(58) Field of Classification Search .................. 62/114, 62/184–185, 201, 244, 259.2, 498, 470–472, 62/84, 85, 117, 196.1–196.4, 275, 278, 500
See application file for complete search history.

(56) References Cited

U.S. PATENT DOCUMENTS

| | | | | |
|---|---|---|---|---|
| 6,161,395 A * | 12/2000 | Okoren et al. | ................. | 62/193 |
| 6,212,900 B1 * | 4/2001 | Iritani et al. | ................. | 62/428 |
| 6,250,090 B1 * | 6/2001 | Mei et al. | ................. | 62/155 |
| 6,604,576 B2 * | 8/2003 | Noda et al. | ................. | 165/202 |
| 6,675,595 B2 * | 1/2004 | Ohya | ................. | 62/199 |
| 6,691,924 B1 * | 2/2004 | Vestergaard et al. | ........ | 236/92 B |
| 7,059,150 B2 * | 6/2006 | Komatsu et al. | ................. | 62/500 |
| 7,121,103 B2 * | 10/2006 | Itoh et al. | ................. | 62/173 |
| 7,228,696 B2 * | 6/2007 | Ambs et al. | ................. | 62/260 |
| 2003/0230096 A1 * | 12/2003 | Hwang | ................. | 62/160 |
| 2004/0194479 A1 * | 10/2004 | Umebayashi et al. | .......... | 62/126 |
| 2006/0130503 A1 * | 6/2006 | Flynn et al. | ................. | 62/196.4 |
| 2006/0179873 A1 * | 8/2006 | Yoshimi et al. | ................. | 62/474 |
| 2006/0220806 A1 * | 10/2006 | Nguyen | ................. | 340/426.36 |
| 2007/0022772 A1 * | 2/2007 | Zhu et al. | ................. | 62/259.2 |
| 2007/0119207 A1 * | 5/2007 | Oshitani et al. | ................. | 62/500 |
| 2007/0245732 A1 * | 10/2007 | Uno et al. | ................. | 60/649 |

FOREIGN PATENT DOCUMENTS

| | | | |
|---|---|---|---|
| JP | 2006-179190 | * | 7/2006 |
| WO | WO2007029180 A2 | * | 3/2007 |

* cited by examiner

*Primary Examiner* — Frantz F. Jules
*Assistant Examiner* — Emmanuel Duke

(57) ABSTRACT

A method and system for removing oil accumulation from refrigerant lines of a vehicle HVAC system having multiple refrigerant loops each having an evaporator is disclosed. The method for operating the system may comprise the steps of: monitoring a flow rate through at least one of the refrigerant loops; determining if the flow rate through any of the at least one refrigerant loops being monitored is below a predetermined flow rate for greater than a predetermined time limit; monitoring for an indication of imminent vehicle operation; and if the indication of imminent vehicle operation is detected and the flow rate through any of the at least one refrigerant loops being monitored is below the predetermined flow rate for greater than the predetermined time limit, opening a valve to allow for maximum flow through the at least one refrigerant loop.

8 Claims, 4 Drawing Sheets

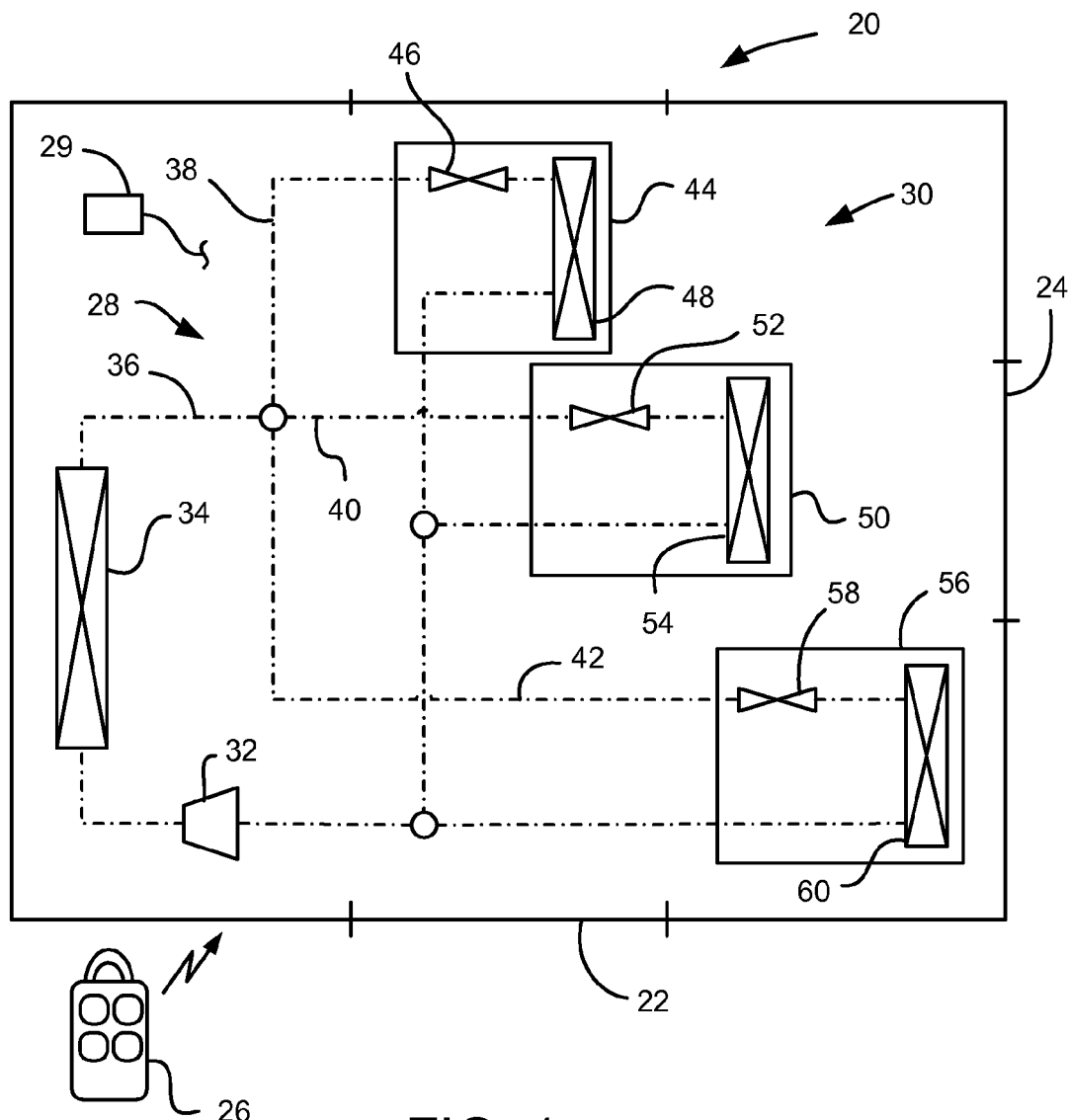
FIG. 1
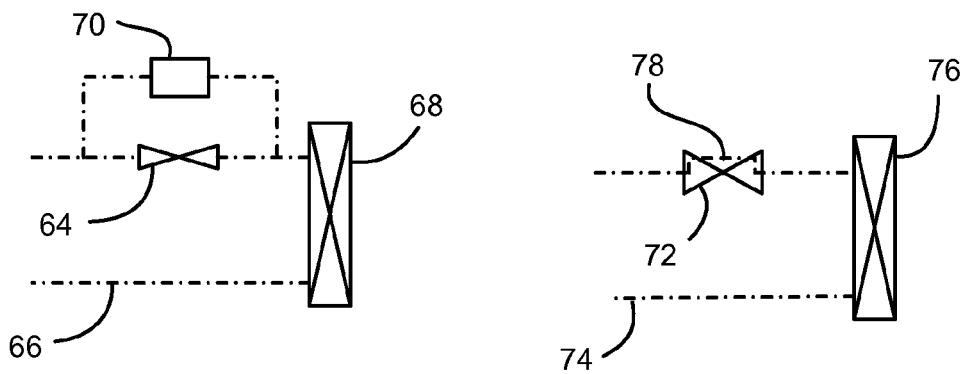
FIG. 2
FIG. 3

REFRIGERANT SYSTEM OIL ACCUMULATION REMOVAL

BACKGROUND OF INVENTION

The present invention relates generally to vehicle heating, ventilation and air conditioning (HVAC) systems having multiple evaporators.

Vehicle HVAC systems may have multiple evaporators. For example, a vehicle may have a front HVAC module, a rear HVAC module and a battery pack cooling module, with each having a refrigerant loop directing refrigerant (including oil) through its respective evaporator. Such HVAC systems have different refrigerant flow rates in each loop that depend upon the particular cooling needs for that loop at any given time. That is, there may be times when the cooling demand from the front HVAC module is high and the demand from the rear HVAC module is low (or none) if there are no passengers in the rear of the passenger compartment. Moreover, the battery pack cooling loads may be significantly less than the passenger cabin cooling loads under some vehicle operating conditions, while under other operating conditions, there may be no passenger cabin cooling loads even though cooling of the battery pack may be needed.

Those loops experiencing low (or no) refrigerant flow over a period of time have the potential for oil accumulation in that loop. Moreover, the packaging space and line routing needed to supply refrigerant flow through these multiple loops to three evaporators, which may be spaced apart by significant distances in some vehicles, may exacerbate the oil accumulation concern by increasing the likelihood of oil accumulation in some lines.

Too much oil accumulation in the refrigerant lines increases the likelihood of increased compressor wear or possible failure if sufficient oil is not returned to the compressor. One may counter this by increasing the oil charge in the system. However, system performance may be reduced since additional oil in the evaporators may reduce the evaporator efficiency. And, the extra oil in the system will increase the cost of the HVAC system.

SUMMARY OF INVENTION

An embodiment contemplates a method of removing oil accumulation from refrigerant lines of a vehicle HVAC system having multiple refrigerant loops each having an evaporator, the method comprising the steps of: monitoring a flow rate through at least one of the refrigerant loops; determining if the flow rate through any of the at least one refrigerant loops being monitored is below a predetermined flow rate for greater than a predetermined time limit; monitoring for an indication of imminent vehicle operation; and if the indication of imminent vehicle operation is detected and the flow rate through any of the at least one refrigerant loops being monitored is below the predetermined flow rate for greater than the predetermined time limit, opening a valve to allow for maximum flow through the at least one refrigerant loop.

An embodiment contemplates a vehicle comprising a HVAC system including a first refrigerant loop and a second refrigerant loop, the first refrigerant loop including a first evaporator, a first refrigerant expansion device, and a first bypass valve, the second refrigerant loop including a second evaporator and a second refrigerant expansion device; and a controller configured to detect an indication of imminent vehicle operation and open the bypass valve when the indication of imminent vehicle operation is detected.

An advantage of an embodiment is the removal of oil accumulation in a vehicle refrigerant system having multiple refrigerant loops, when some of the refrigerant loops operate with low refrigerant loads. This avoids wear concerns that may arise from low oil in the compressor, avoids reduced system performance that may occur when oil accumulates in a compressor, and allows for a minimum oil charge in the refrigerant, thus reducing costs.

BRIEF DESCRIPTION OF DRAWINGS

FIG. 1 is a schematic diagram of a portion of a vehicle HVAC system.

FIG. 2 is a schematic diagram of a portion of the vehicle HVAC system of FIG. 1, but illustrating a second embodiment.

FIG. 3 is a schematic diagram of a portion of the vehicle HVAC system of FIG. 1, but illustrating a third embodiment.

DETAILED DESCRIPTION

Figure 4:
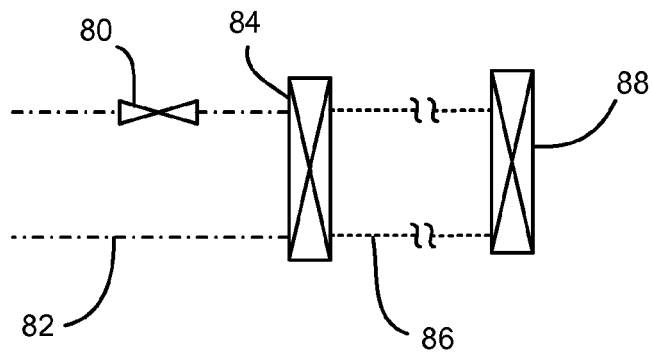
FIG. 4 is a is a schematic diagram of a portion of the vehicle HVAC system of FIG. 1, but illustrating a fourth embodiment.

Referring to FIG. 1, a vehicle, indicated generally at 20, is shown. The vehicle 20 includes doors 22 and may include a hatch 24 or a key fob 26 (or other keyless entry system). The vehicle 20 also includes a heating, ventilation and air conditioning (HVAC) system 28 controlled by a controller 29.

The HVAC system 28 includes a refrigerant system 30 that has a compressor 32, a condenser 34 and multiple refrigerant loops connected by refrigerant lines 36 directing refrigerant through the various components. This refrigerant contains oil that flows with the refrigerant to provide lubrication to the compressor 32. The exemplary embodiment shown in FIG. 1 includes three refrigerant loops, a forward refrigerant loop 38, a rear (also called auxiliary) refrigerant loop 40, and a battery refrigerant loop 42. The forward refrigerant loop includes a forward HVAC module 44 having a forward expansion device 46 and a forward evaporator 48. The rear refrigerant loop 40 includes a rear HVAC module 50 having a rear expansion device 52 and a rear evaporator 54. And the battery refrigerant loop 42 includes a battery pack assembly 56 having a battery expansion device 58 and a battery cooling evaporator 60.

The expansion devices 46, 52, 58 are electronic expansion devices, each having a larger maximum orifice (relative to conventional electronic expansion devices for vehicle air conditioning systems in a similar sized vehicle), allowing for increased refrigerant mass flow at full open (again, relative to a similar sized conventional vehicle air conditioning system).

In addition, the compressor 32 may be sized for increased mass flow (relative to a similar sized vehicle air conditioning system), which may be accomplished, for example, by increasing the compressor stroke, increasing head pressure and increasing suction pressure. This compressor 32, then will allow for variable capacity or some other type of speed control to allow for control over the refrigerant mass flow.

FIG. 2 illustrates a portion of the HVAC system according to a second embodiment. In this embodiment, a refrigerant expansion device 64 is connected, via refrigerant lines 66, to an evaporator 68. An external bypass valve 70 is connected in parallel with the expansion device 64. The expansion device 64 may be a thermal expansion valve or an orifice tube. The external bypass valve 70 is movable between at least a full open and a fully closed position and can be activated by, for example, increased head pressure or electronic actuation. The expansion device 64, evaporator 68 and external bypass valve 70 may be substituted for one or more of the expansion devices and evaporators of the HVAC system shown in FIG. 1.

FIG. 3 illustrates a portion of the HVAC system according to a third embodiment. In this embodiment, a refrigerant expansion device 72 is connected, via refrigerant lines 74, to an evaporator 76. An internal bypass valve 78 is connected in parallel with the expansion device 72. The expansion device 72 may be a thermal expansion valve or an orifice tube. The internal bypass valve 78 is movable between at least a full open and a fully closed position and can be activated by, for example, increased head pressure or electronic actuation. The expansion device 72, evaporator 76 and internal bypass valve 78 may be substituted for one or more of the expansion devices and evaporators of the HVAC system shown in FIG. 1.

FIG. 4 illustrates a portion of the HVAC system according to a fourth embodiment. In this embodiment, a refrigerant expansion device 80 is connected, via refrigerant lines 82, to an evaporator 84. The expansion device 80 may be an electronically controlled thermal expansion valve. The evaporator 84 is a refrigerant-to-coolant heat exchanger, with coolant lines 86 directing coolant through a chiller 88. In this embodiment, evaporator load control is employed, with an increase in load caused by increasing a speed of a fan in a battery pack assembly and the coolant flow through the battery pack assembly. The expansion device 80, evaporator 84, coolant lines 86 and chiller 88 may be substituted for components in the battery refrigerant loop 42 of the HVAC system shown in FIG. 1.

Figure 5:
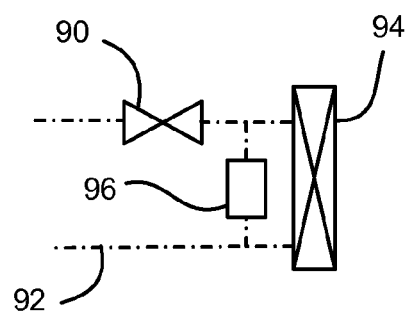
FIG. 5 is a is a schematic diagram of a portion of the vehicle HVAC system of FIG. 1, but illustrating a fifth embodiment.

FIG. 5 illustrates a portion of the HVAC system according to a fifth embodiment. In this embodiment, a refrigerant expansion device 90 is connected, via refrigerant lines 92, to an evaporator 94. An external bypass valve 96 is connected in parallel with the evaporator 94. The expansion device 90 may be an electronically controlled thermal expansion valve. The external bypass valve 70 is movable between at least a full open and a fully closed position and can be activated by, for example, increased head pressure, increased suction pressure, or electronic actuation. The expansion device 90, evaporator 94 and external bypass valve 96 may be substituted for one or more of the expansion devices and evaporators of the HVAC system shown in FIG. 1.

Figure 6A:
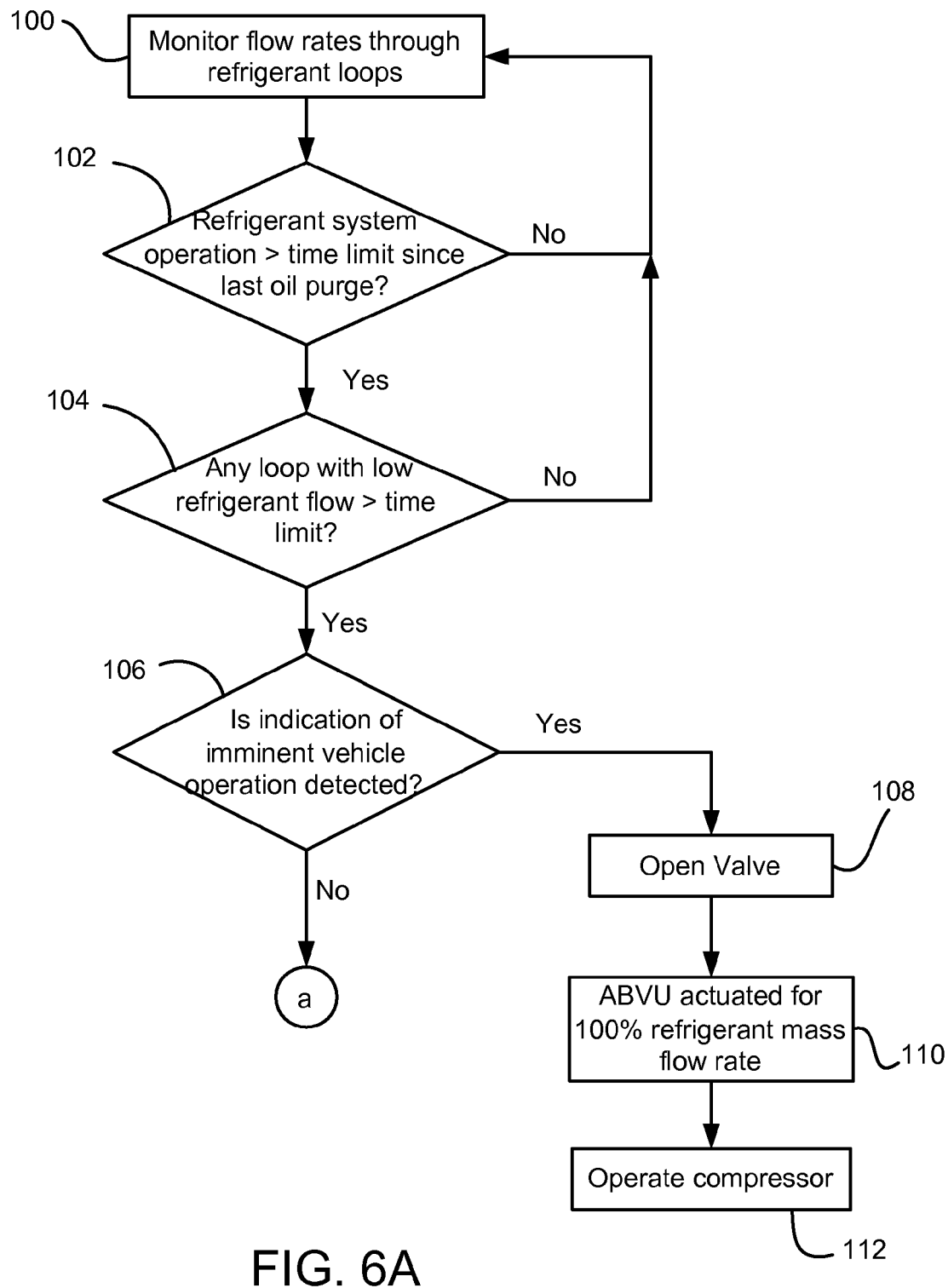
FIGS. 6A and 6B are a flow chart illustrating a method of removing oil accumulation from refrigerant lines of an HVAC system.
Figure 6B:
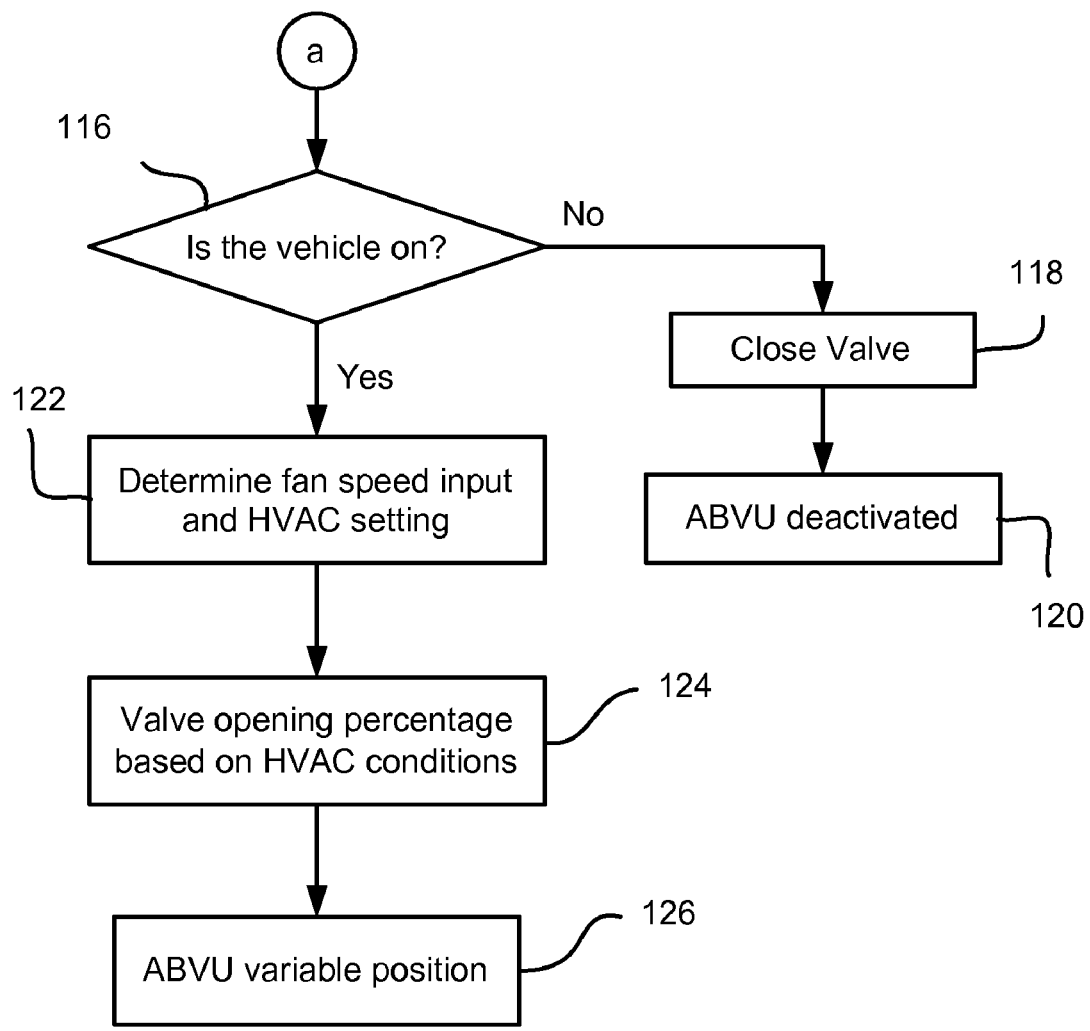

FIGS. 6A and 6B are a flow chart illustrating a method of removing oil accumulation from refrigerant lines in the HVAC system 28 shown in FIG. 1, and is also applicable to the portions of HVAC systems shown in FIGS. 2-5. The method accounts for small flow rates of refrigerant through some refrigerant loops by periodically substantially increasing the flow rate to have sufficient flow to carry oil back to the compressor 32.

The refrigerant flow rates through the refrigerant loops 38, 40, 42 are monitored, block 100. A determination is made whether the refrigerant system operation is greater than a predetermined time limit since the last oil purge, block 102. If not, the monitoring continues. If yes, then a determination is made whether any of the refrigerant loops has had a low (or no) refrigerant flow for greater than a predetermined time limit, block 104. That is, if one of the refrigerant loops 38, 40, 42 has been operating with low or no refrigerant flow during this time period, then it is likely that oil has begun to accumulate in that particular loop.

If none of the refrigerant loops 38, 40, 42 has been operating during this time period with low flow, then the monitoring continues. If, on the other hand, at least one of the loops 38, 40, 42 has been operating with low or no refrigerant flow during this time period, a determination is made whether there has been an indication of imminent vehicle operation detected, block 106. An indication of imminent vehicle operation may include, for example, opening a vehicle closure, such as a door 22 or a hatch 24, and/or activating an operation on a key fob 26 (or other keyless entry system).

If the indication of imminent vehicle operation is detected, then a valve is opened, block 108 and an automatic bypass valve unit (ABVU) is activated for 100% refrigerant mass flow rate, block 110. In the first embodiment, since the expansion devices 46, 52, 58 are electronic expansion devices with large maximum orifice sizes, the valve and ABVU are, in effect, integrated into the same valve. In the second embodiment of FIG. 2, the valve is the expansion device 64 and the ABVU is the external bypass valve 70. In the embodiment of FIG. 3, the valve is the expansion device 72 and the ABVU is the internal bypass valve 78. In the embodiment of FIG. 4, the valve is the expansion device 80 and the ABVU is the effect created by increasing the battery pack fan speed and coolant flow through the evaporator 84. In the embodiment of FIG. 5, the valve is the expansion device 90 and the ABVU is the external bypass valve 96. When the valve is open, block 108 and the ABVU opened 100%, the compressor 32 is operated to cause maximum refrigerant mass flow through the refrigerant system 30. This maximum mass flow, then, will have sufficient flow to carry the oil back to the compressor 32.

If the indication of imminent vehicle operation is not detected, block 106, then a determination is made whether the vehicle 20 is on, block 116. If the vehicle 20 is not on, then the valve is closed, block 118 and the ABVU is deactivated, block 120. For the processes of blocks 118 and 120, there is no refrigerant flow. If the vehicle is on, then a fan speed input and HVAC setting are determined, block 122. The valve for each loop 38, 40, 42 is opened a percentage based on the HVAC (and battery cooling) conditions, block 124. Also, the ABVU may be actuated into variable positions based on the HVAC (and battery cooling) conditions, block 126.

Figure 7A:
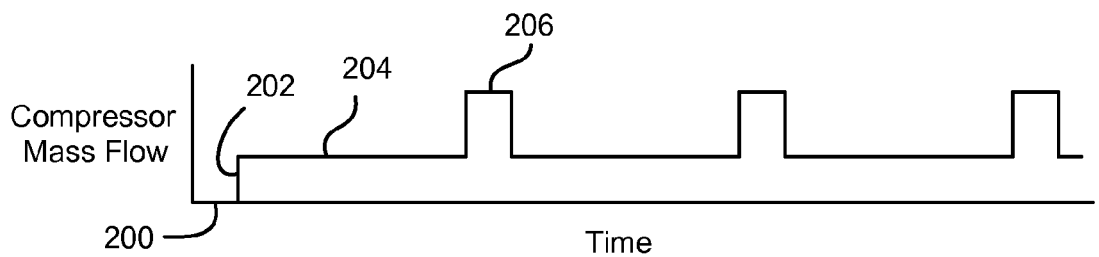
FIG. 7A is a graph illustrating the compressor mass flow of refrigerant over time.
Figure 7B:
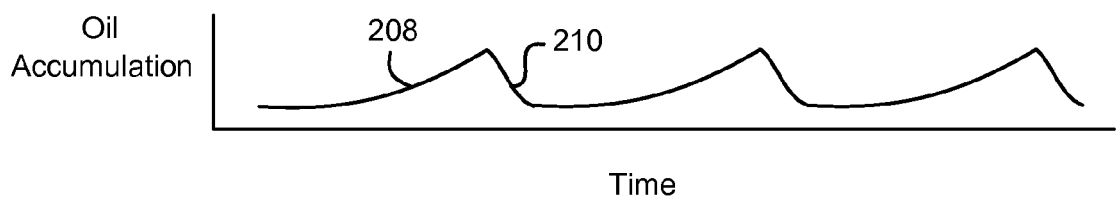
FIG. 7B is a graph illustrating the oil accumulation over time for the compressor mass flow of FIG. 7A.

FIG. 7A is a graph illustrating one possible scenario for compressor mass flow of refrigerant over time for one of the refrigerant loops, and FIG. 7B is a graph illustrating the oil that may accumulate in refrigerant lines of that loop over time for the compressor mass flow of FIG. 7A. At compressor off 200, there is no mass flow. At compressor on 202, under certain operating conditions, there may be a relatively low compressor mass flow 204 in a particular loop, which allows for oil to begin accumulating 208 in that loop. When appropriate under the method discussed above for removing oil accumulation, the mass flow is significantly increased 206 for a predetermined time sufficient to reduce the oil accumulation 210 in that refrigerant loop and then decreased to the desired level. These step increases and decreases are then repeated as needed to assure oil accumulation is removed in the refrigerant loops. The step increase and decrease in mass flow is accomplished employing the hardware of the embodiments of FIGS. 1-5 above.

While certain embodiments of the present invention have been described in detail, those familiar with the art to which this invention relates will recognize various alternative designs and embodiments for practicing the invention as defined by the following claims.

What is claimed is:

1. A method of removing oil accumulation from refrigerant lines of a vehicle HVAC system having multiple refrigerant loops each having an evaporator, the method comprising the steps of:
   (a) monitoring a flow rate through at least one of the refrigerant loops;
   (b) determining if the flow rate through any of the at least one refrigerant loops being monitored is below a predetermined flow rate for greater than a predetermined time limit;
   (c) monitoring for an indication of imminent vehicle operation; and
   (d) if the indication of imminent vehicle operation is detected and the flow rate through any of the at least one refrigerant loops being monitored is below the predetermined flow rate for greater than the predetermined time limit, opening a valve to allow for maximum flow through the at least one refrigerant loop.

2. The method of claim 1 wherein step (d) is further defined by the valve being an external bypass valve that is actuatable to selectively allow for refrigerant flow around a thermal expansion device in the at least one refrigerant loop.

3. The method of claim 1 wherein step (d) is further defined by the valve being an internal bypass valve that is actuatable to selectively allow for refrigerant to flow around an orifice in a thermal expansion device in the at least one refrigerant loop.

4. The method of claim 1 wherein step (d) is further defined by the valve being an external bypass valve that is actuatable to selectively allow for refrigerant flow to bypass the evaporator in the at least one refrigerant loop.

5. The method of claim 1 wherein step (d) is further defined by the valve being an oversized thermal expansion valve that is actuatable to open 100% to increase the refrigerant flow rate through the thermal expansion valve in the at least one refrigerant loop.

6. The method of claim 1 wherein step (c) is further defined by the indication of imminent vehicle operation being an opening of a vehicle closure.

7. The method of claim 1 wherein step (c) is further defined by the indication of imminent vehicle operation being an actuation of a function on a key fob.

8. The method of claim 1 comprising the steps of:
   (e) after step (d), if the vehicle is turned on, then adjusting the valve to return to air conditioning operation based on vehicle HVAC conditions.

* * * * *